(12) United States Patent
Kumar M et al.

(10) Patent No.: US 12,549,373 B2
(45) Date of Patent: Feb. 10, 2026

(54) AUTHENTICATION OF USERS UTILIZING BIOMETRIC DATA IN A NON-CENTRALIZED COMPUTER SYSTEM

(71) Applicant: Mitel Networks Corporation, Kanata (CA)

(72) Inventors: Chandan Kumar M, Karnataka (IN); Logendra Naidoo, Ottawa (CA)

(73) Assignee: Mitel Networks Corporation, Kanata (CA)

(*) Notice: Subject to any disclaimer, the term of this patent is extended or adjusted under 35 U.S.C. 154(b) by 0 days.

(21) Appl. No.: 18/762,403

(22) Filed: Jul. 2, 2024

(65) Prior Publication Data

US 2026/0012349 A1  Jan. 8, 2026

(51) Int. Cl.
*H04L 29/06* (2006.01)
*H04L 9/00* (2022.01)
*H04L 9/32* (2006.01)

(52) U.S. Cl.
CPC .......... *H04L 9/3231* (2013.01); *H04L 9/3242* (2013.01); *H04L 9/50* (2022.05)

(58) Field of Classification Search
CPC ........ H04L 9/3231; H04L 9/3242; H04L 9/50
See application file for complete search history.

(56) References Cited

U.S. PATENT DOCUMENTS

| | | | | |
|---|---|---|---|---|
| 11,190,355 B2* | 11/2021 | Wang | ............. | H04L 9/3231 |
| 2016/0012465 A1* | 1/2016 | Sharp | ............. | G06Q 20/321 |
| | | | | 705/14.17 |
| 2018/0048461 A1* | 2/2018 | Jutla | ............. | H04L 9/3268 |
| 2019/0036932 A1* | 1/2019 | Bathen | ............. | H04L 63/0428 |
| 2019/0149537 A1 | 5/2019 | Armin et al. | | |
| 2020/0145219 A1 | 5/2020 | Dalys et al. | | |
| 2020/0167775 A1* | 5/2020 | Reese | ............. | G06Q 20/38215 |
| 2020/0382510 A1* | 12/2020 | Dunjic | ............. | H04L 63/102 |
| 2021/0014064 A1* | 1/2021 | Channa | ............. | H04L 63/0876 |
| 2021/0036854 A1* | 2/2021 | Dunjic | ............. | H04L 9/3247 |
| 2021/0182272 A1* | 6/2021 | Shpurov | ............. | H04L 9/3271 |

(Continued)

FOREIGN PATENT DOCUMENTS

EP    3592006 A1    1/2020

OTHER PUBLICATIONS

Fastercapital, Password Protection: Enhancing Password Security with Private Keys, Mar. 31, 2025, fastercapital.com.

*Primary Examiner* — Mahfuzur Rahman

(57) ABSTRACT

A system for authenticating a sender of a response to an authentication request includes an authentication server, an identity server configured to receive biometric data of a user, a central ID system configured to create or receive a username and/or password, and a first user device associated with a first user. The first user device is configured to create a first user ID that includes at least a first username and a first biometric data. When an authentication request is sent to a user device by the authentication server the user device responds with a user ID. The authentication server then queries at least one or both of the central ID system and the identity server to certify the accuracy of the user ID to assure it matches the first user ID before (1) accepting the response, or (2) permitting the first user to access confidential information. The systems and methods may also include blockchain authentication or tuple space authentication.

20 Claims, 9 Drawing Sheets

(56) References Cited

U.S. PATENT DOCUMENTS

2021/0184841 A1* 6/2021 Shpurov .............. H04L 9/3263
2021/0184843 A1* 6/2021 Shpurov .............. H04L 9/0861
2021/0184850 A1* 6/2021 Shpurov .............. H04L 9/3247
2022/0283886 A1* 9/2022 Brown ................. H04W 12/10

* cited by examiner

AUTHENTICATION OF USERS UTILIZING BIOMETRIC DATA IN A NON-CENTRALIZED COMPUTER SYSTEM

BACKGROUND

There is a need to maintain security when attendees (or users) are invited to access confidential information, such as being invited to an event, such as an electronic meeting. In that case, the invited user's response and perhaps the invitation should be authenticated. There is a potential risk of relying solely on usernames, passwords, or access codes. Security breaches, unauthorized access, and the compromising of sensitive, confidential information, participant information, or organizational information, can all occur in centralized computer systems.

The problems with authentication and security may exist in electronic communication sessions in which invitations are sent and an unauthorized person who gained access to a user's username and password (and potentially an access code) can use them to, for example, receive an invitation or any request to authenticate the user identity, and then respond to the authentication request (such as an online meeting invitation), and potentially access confidential information, such as an electronic communication session, and possibly obtain confidential information. The unauthorized user may be from outside of an organization, or outside of a group of intended participants within the organization, and use the intended user's credentials.

There is also a possibility that the authentication request that may include a link or other access to confidential information, such as a meeting invitation, is unauthorized.

The systems and methods of this disclosure introduce an approach to user authentication by leveraging a user's biometric data, preferably provided by the user to a one or more different system device(s) that provides or stores usernames, passwords, and access codes, in order to enhance security. This reduces the risks of centralized points of failure or security breach, automates access management, and creates a relatively tamper-resistant method of authenticating users and access permissions, resulting in more secure and trustworthy authentication, as an example, for conferencing events, such as online meetings, or the sharing of or providing access to any confidential information. The systems and methods of this disclosure may also include blockchain or tuple space authentication for users and possibly authentication requests.

Any discussion of problems provided herein has been included in this disclosure solely for the purposes of providing a background and should not be taken as an admission that any or all of the discussion was known at the time the invention was cancelled.

BRIEF DESCRIPTION OF THE DRAWING FIGURES

The subject matter of the present disclosure is particularly pointed out and distinctly claimed in the concluding portion of the specification. A more complete understanding of the present disclosure, however, may best be obtained by referring to the detailed description and claims when considered in connection with the drawing figures, wherein like numerals denote like elements and wherein:

Figure 1:
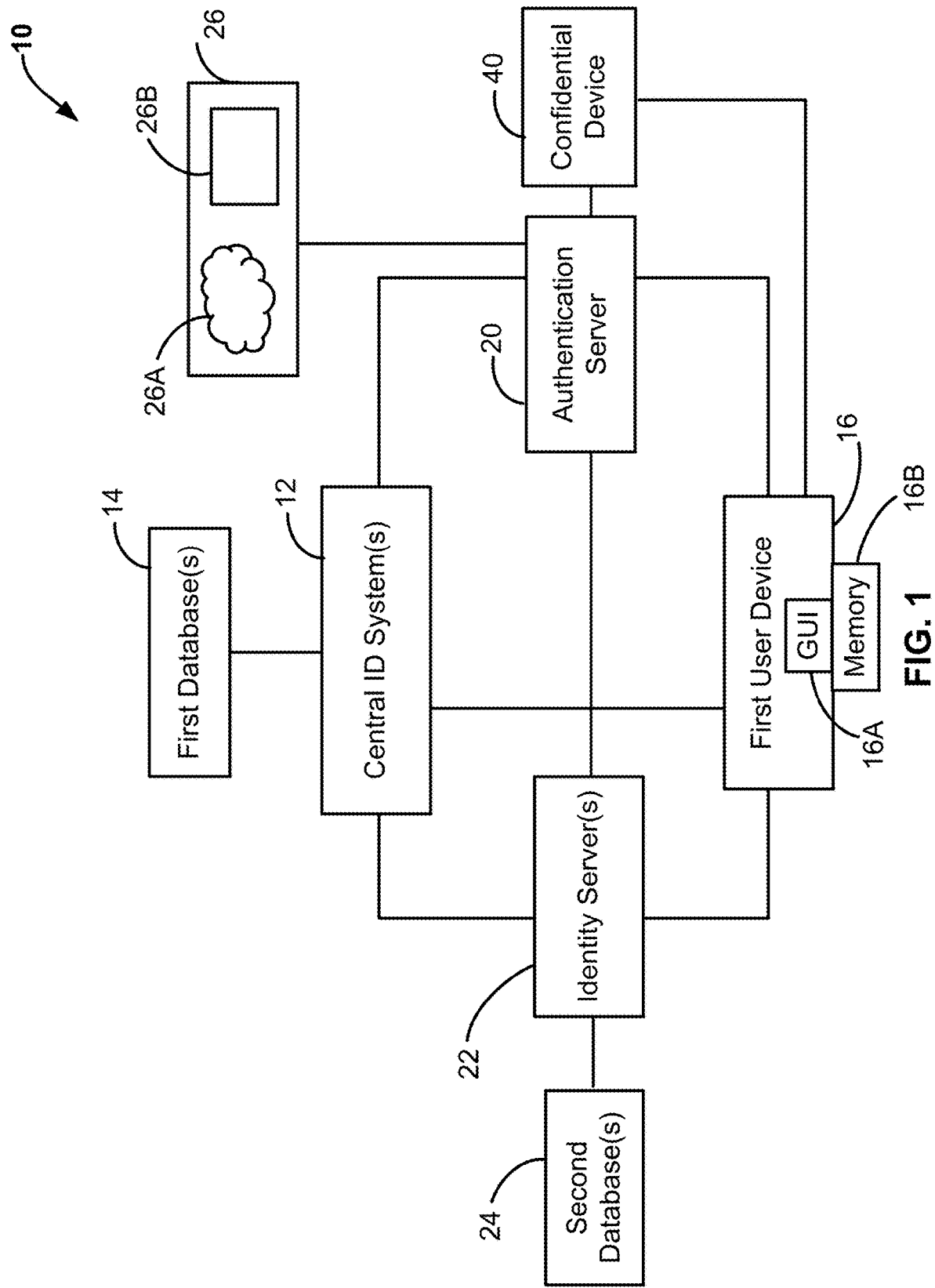
FIG. 1 illustrates an electronic, cloud-based or server-based communication system adapted to provide certification of users, utilizing biometric data, in accordance with exemplary embodiments of the disclosure.

It will be appreciated that elements in the figures are illustrated for simplicity and clarity and have not necessarily been drawn to scale. For example, the dimensions of some of the elements in the figures may be exaggerated relative to other elements to help to improve understanding of illustrated embodiments of the present invention.

DETAILED DESCRIPTION

The description of exemplary embodiments of the present invention provided herein is merely exemplary and is intended for purposes of illustration only; the following description is not intended to limit the scope of the invention as claimed. Moreover, recitation of multiple embodiments having stated features is not intended to exclude other embodiments having additional features or other embodiments incorporating different combinations of the stated features.

As set forth in more detail herein, exemplary embodiments of this disclosure relate to electronic authentication of users being provided access to confidential information, such as by participating in communication alerts, and corresponding methods performed by such systems, that can, for example, provide authentication of a user prior to the user accessing confidential information, such as by accepting, rejecting, altering, responding to, or annotating, an electronic authentication request, such as one for a meeting invitation, or attending an electronic communication session (also referred to herein as a meeting conference) or being provided access to confidential organizational information. Systems and methods of this disclosure identify the user through information, such as a username and password, and/or an access code, which are maintained at or generated by one or more central ID system(s), plus by user (also sometimes referred to herein as a participant or attendee) biometric data, which may be maintained at one or more system locations separate from the central ID system(s). A system or method of this disclosure may also include blockchain or tuple space authentication for both an authentication request or user response.

Such systems and methods aim to address challenges associated with traditional centralized authentication systems and methods to authenticate the validity of requests and the identity of users. One main issue it solves is the security flaws in using single points of control, such as systems that create, generate, and/or store usernames, passwords, or access codes by/at a single device or entity, which can more easily lead to vulnerabilities, such as hacking, illegal access, the possible compromise of user data, and ultimately permitting improper access to confidential information.

The ordinary sequence of custody, control, transfer, analysis, and disposition of an authentication request, such as a meeting request, can be secured using the systems and methods described herein, which do not rely on the principle of encryption (although encryption may be used) but, instead, make use of a user ID that helps govern an authentication request, which can be for a meeting invitation, and a response that could be either acceptance, deletion, denial, requesting a new date or time, adding annotations, and/or attending the meeting.

The systems and methods herein create an authentication request, such as for a meeting invitation, from a program hosted on an authentication server. In the case when the authentication server is part of a meeting server or is in communication with a meeting server, a meeting host causes the meeting server to send a meeting invitation to a user who sends a response to the invitation. The system and method can first authenticate the request and can then authenticate the user ID using one or more of the user's username and password, and possibly other codes (such as a meeting access code) or information, plus the user's biometric data. As mentioned previously, blockchain and tuple space authentication may also be involved.

As used herein, the terms application, module, analyzer, engine, and the like can refer to computer program instructions, encoded on computer storage medium for execution by, or to control the operation of, data processing apparatus. Alternatively or additionally, the program instructions can be encoded on an artificially-generated propagated signal, e.g., a machine-generated electrical, optical, or electromagnetic signal, which is generated to encode information for transmission to suitable receiver apparatus for execution by a data processing apparatus. A computer storage medium can be, or be included in, a computer-readable storage device, a computer-readable storage substrate, a random or serial access memory array or device, or a combination of one or more of the substrates and devices. Moreover, while a computer storage medium is not a propagated signal, a computer storage medium can be a source or destination of computer program instructions encoded in an artificially-generated propagated signal. The computer storage medium can also be, or be included in, one or more separate physical components or media (e.g., solid-state memory that forms part of a device, disks, or other storage devices).

In one embodiment, an electronic authentication system for authenticating a sender of an electronic communication, such as a response to an authentication request, such as one for a meeting invitation, or a response to any authentication request, can include: (1) one or more central identification (ID) systems; (2) an authentication server, such as a server running a meeting server that sends meeting requests, manages responses, and operates electronic meetings, or is a separate server, or is in part of or in communication with any other server or database that includes confidential information; the authentication server is in communication with the one or more central ID systems; (3) an identity server(s) in communication with the authentication server and with at least one of the central ID systems, wherein the identity server receives and stores at least some biometric data of a first user; and (4) a first user device that is associated with the first user, wherein the first user device has a graphical user interface (GUI), may have a first user application programming interface (API) and a first user device memory, and wherein the first user device is in communication with the identity server(s), the central ID system(s), and the authentication server.

The first user device is configured to create a first user ID that includes (1) one or more of a first username and a first user password, and/or one or more other codes (such as access codes) or information, plus (2) a first biometric data of the first user, which may be a plurality of first user biometric data. The first user device is configured to transmit some or all of the first biometric data to at least the identity server(s) or the first user device memory. Each identity server is configured to receive and store some or all of the first user biometric data in a second database and/or to transmit some of the first biometric data to one or more of the central ID systems. The one or more central ID systems are configured to store information, such as a username and password, plus any other access codes or information, in a first database.

In one embodiment, the first user device responds to an authentication request, such as an electronic meeting invitation generated by a meeting server, sent by the authentication server, wherein the response includes the first user ID, which has user biometric information stored in the identity server(s) or another location, such as the first user device memory, or in the central ID system(s). The authentication server accesses the biometric data and the other first user ID information from the various locations of the system and compares the first user ID provided by the first user device to the saved first user ID on the system, which includes the first biometric data and the other first user ID information. If the first user ID sent by the first user device to the authentication server matches the first user ID stored at various locations in the system, such as the identity server(s), the first user device memory, and the one or more central ID servers, the first user is authenticated and the authentication server is authorized to receive a response from the first user device to the authentication request, such as a meeting invitation. In other scenarios, once the first user ID is authenticated, the user will be permitted access to confidential information different from a meeting invitation or meeting attendance.

A system and method of this disclosure may be configured to prevent the sending of a response to, for example, a meeting invitation or of a user attending a meeting if the first user ID sent by the first user device to the authentication server does not match the saved first user ID. In that case, an alert of a security breach, such as a warning message and/or icon (e.g., a red stop sign symbol alone, a text message or email, such as "Suspected Breach" or "Unauthorized Distribution Detected," or a combination thereof) may pop up on a display of the first user device email utility, and/or in an email utility of a meeting organizer, meeting planner, or meeting host's user device, and the alert may be sent to the authentication server, or to a system administrator, or any suitable person. For example, if a person (e.g., the first user or someone believed to the first user) attempts to: respond to an authentication request, such as a meeting invitation, delete it, alter it, add annotations, suggest an alternate meeting date or time, or attempts to attend the meeting, or to otherwise access confidential information, the systems and methods of this disclosure can authenticate the user before any action is permitted. The systems and methods of this disclosure may be configured to not allow tampering to begin with (e.g., the user must be authenticated before being able to respond to a meeting invitation or otherwise being allowed access to confidential information), as well as to deny access to attending the meeting.

Turning now to the Figures, wherein the purpose is to describe embodiments of the disclosure and not to limit the scope of the claims, FIG. 1 illustrates an electronic communication system 10 according to this disclosure that authenticates a first user identity (ID) before permitting the first user (although the systems and methods herein can apply to any user or users) to access confidential information, such as by responding to a meeting request or attend a meeting. As shown, system 10 includes one or more central (or centralized) ID systems 12, each having a first database 14 in which portions (or all) of the first user ID is stored. System 10 may include any suitable number of central ID systems 12, each having a first database 14 and any aspect(s) of a first user ID may be stored at any of the one or more first databases 14. First database 14 may save a first user ID comprising only a username and password, and possibly other first user ID indicia such as access codes or an IP address, and may include part or all of user biometric data if the biometric data is communicated to central ID system 12 by identity server 22 or first user device 16. Although a first user ID is referenced herein, system 10 may create and store any suitable number of user IDs.

Figure 2:
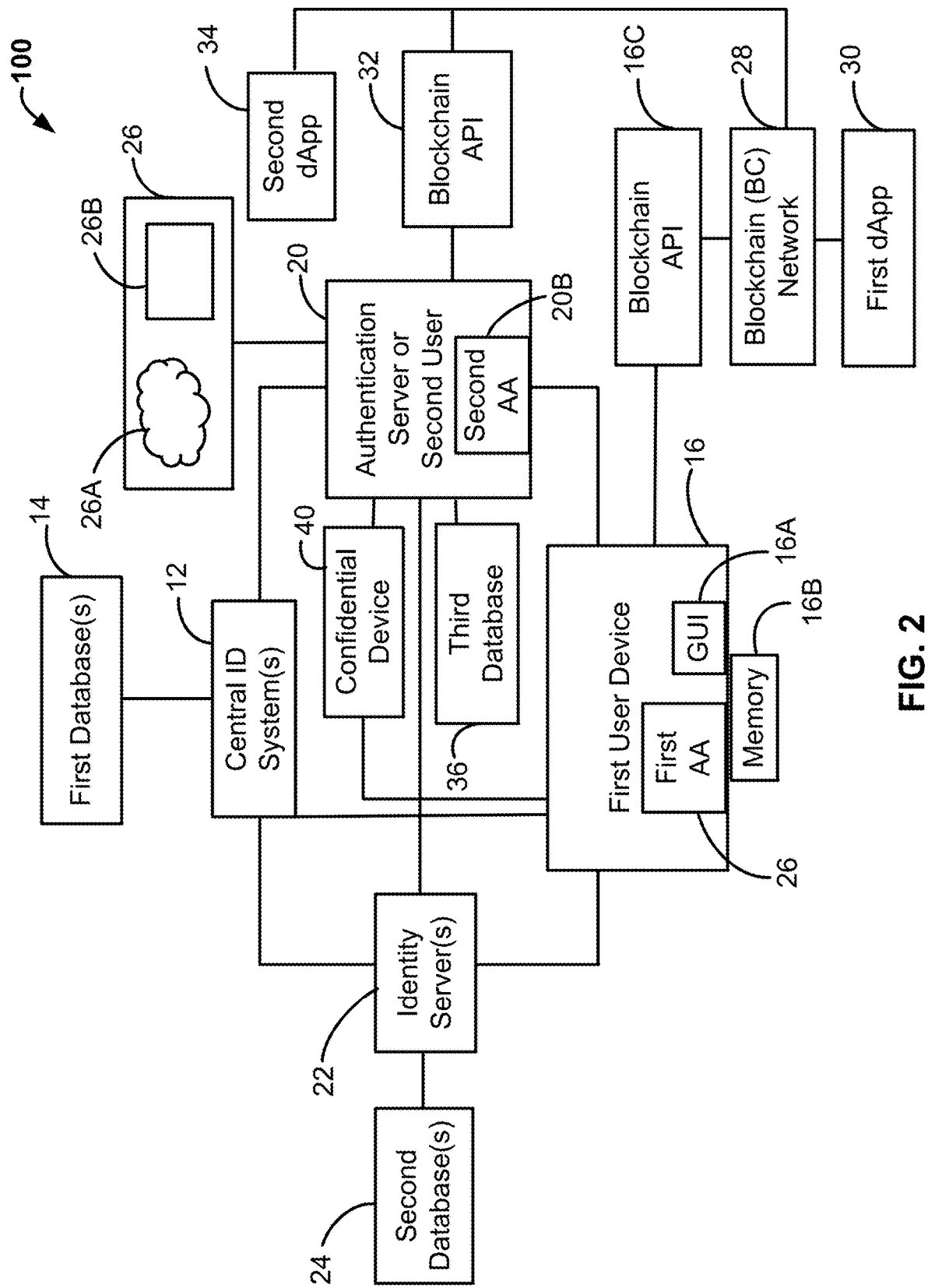
FIG. 2 illustrates an alternate electronic, cloud-based or sensor-based system that uses blockchain for certification of users accepting an authentication request, such as for a meeting invitation.

A first user device 16 has an graphical user interface (GUI) 16A that permits first user device 16 to communicate with other system 10 components. First user device 16 may also be configured to store all or part of a first user biometric data (also referred to herein as "one or more first biometric data" or "first biometric data") in a first user device memory 16B. A first user uses first user device 16 to communicate with an authentication server 20, with one or more identity servers 22, and with one or more central ID servers 12. Each identity server 22 has a second database 24 that preferably stores some biometric data of the first user transmitted to identity server 22 by first user device 16, and optionally also the biometric data of other users of system 10. Authentication server 20 is preferably provided by a network 26, such as a cloud-based network 26A or a server-based network 26B. As shown in FIGS. 1 and 2, the authentication server is a separate device from confidential device 40 and is configured to authenticate user IDs before permitting access to confidential device 40, but authentication server 20 may be part of confidential device 40. The central ID system(s) 12 and identity server(s) 22 are in communication with the authentication server 20.

First user device 16 (used in both system 10 and system 100 although first AA 26 is only required in system 100) can be or can include any suitable device with wired or wireless communication features that can communicate with authentication server 20, identity server(s) 22, and central ID server(s) 12. For example, first user device 16 can be or include a wearable device, a tablet computer, a wired phone, a mobile phone, a personal (e.g., laptop or desktop) computer, a streaming device, such as a game console or other media streaming device, or the like. If first user device 16 has first AA 26 it can also communicate with blockchain API 16C and blockchain network 28 as shown in FIG. 2.

Although one first user device 16 is shown, system 10 or system 100 (shown in FIG. 2) may include multiple user devices. System 10 or system 100 may be provided by a cloud-based or server-based network.

The GUI 16A may perform several functions within system 10 or system 100. First, the GUI 16A is used to communicate with centralized ID system(s) 12 and identity server(s) 22 to collectively create a first user ID. The first user (which is the operator of first user device 16) creates an identify (or account) by, for example, creating or being assigned a username by central ID system(s) 12 and creating or being assigned a user password by the central ID system(s) 12. Other indicia, such as one or more codes or other information, used to identify the first user, may also be created or assigned by the central ID system(s) 12. This information is stored in first database(s) 14 of the central ID system(s) 12, and if more than one first database 14 is utilized the information related to the first user may be stored piecemeal in separate of first database(s) 14.

The GUI 16A also permits the first user device 16 to provide biometric data of the first user to identity server(s) 22 and/or first user device memory 16B. The biometric data may be any suitable data unique to the first user, such as one or more of a fingerprint(s), thumbprint(s), palmprint(s), iris scan, facial image, blood type, vascular signature, footprint(s), voice, white noise, brainwave signatures for biometric authentication (which can be provided by an electroencephalogram (EEG) and/or brain-computer-interface technologies), or the first user's gait. A system or method of this specification could also combine multiple biometric data to enhance utility and increase security. If multiple biometric data is utilized, each of the multiple biometric data may be stored at a separate location. For example, one biometric data may be stored in a second database 24 of an identity server 22, and another biometric data may be stored at another second database of another identity server 22 or at first user device memory 16B.

One or more biometric data of the first user may be saved in any suitable one or more components of system 10 (or any other system or method of this specification). Using GUI 16A of first user device 16, the first user can send one or more biometric data to identity server 22 which can save the biometric data in second database 24. Identity server 22 may communicate some or all of the one or more biometric data to centralized ID system 12 to be stored in first database 14 or may not, thereby keeping the biometric data separate from the other user ID information stored in first database 14.

Some of the one or more of the biometric data can be saved in first database 14, while other of the one or more of the biometric data may be stored in second database 24, and/or other of the one or more biometric data may be stored in a memory of first user device 16. Or all of the one or more of the biometric data may be stored in second database 24. Or all of the one or more biometric data may be stored in a memory of first user device 16. Or some of the one or more biometric data may be stored in second database 24 and other of the one or more biometric data may be stored in a memory of first user device 16. Or some of the one or more biometric data may be stored in first database 14 and other of the one or more biometric data may be stored in a memory of first user device 16. Any of these methods of storing the one or more biometric data may be utilized according to any system or method of this disclosure. Any first user ID 10 can be configured to include any of the one or more biometric data, which must be authenticated by authentication server 20 when authentication server 20 authenticates the first user ID.

During operation of the system 10, the first user uses GUI 16A of first user device 16 to contact the central ID system 12 to create (or be assigned) a username and to create (or be assigned) a password. As mentioned, other indicia of the identity of the first user may also be created or added and stored, such as an internet protocol (IP) address, one or more access codes, other codes, or personal information such as birthday, type of car, mother's name, school name, friend's names, or portions of a social security number.

Confidential device 40 is any information server, database, meeting server or any server, structure, software, device or database that includes potentially confidential information and that requires authentication of the first user ID by the authentication server 20 before it can be accessed by the first user. In one embodiment, confidential device 40 is a meeting server that sends a meeting request through authentication server 20 to what it believes is first user device 16. The meeting request (or other communication from confidential device 40) can first be authenticated by authentication server 20 and/or by blockchain network 38 (in system 100), or CTS 512 (in system 500), before being sent to first user device 16. Confidential information that may be accessible or saved in device 40 could be financial, accounting, economic, competitive, personnel, legal, IT, historical, regulatory, or other. Authentication server 20 sends the meeting request or other communication related to accessing confidential information from device 40 to what is believed to be first user device 16.

The authentication server 20 sends an authentication request, which may for or be part of a meeting invitation or other request to access confidential information, to what is believed to be first user device 16. In response to the request, the device to which the authentication request was sent, depending upon the methodology of system 10, can (1) send the first user ID to authentication server 20 for authentication before a response to the authentication server 20 is permitted to be sent, or (2) send a response to the authentication request that includes the first user ID. Authentication server 20, before accepting a response or forwarding it to confidential device 40, authenticates the first user ID that includes the one or more user biometric data. As one example, if the first user's one or more biometric data is saved in database 14 of centralized ID system 12, meeting server 20 queries central ID system 12 to determine whether the first user ID sent by the user device believed to be first user device 16 matches all data that makes up the first user ID in first database 14. If the first user ID is a match, the authentication server 20 accepts and processes the response from the first user device 16 to, for example, a meeting invitation and also permits the first user to join the meeting at the meeting date and time. If the first user ID sent to authentication server 20, either alone or with a proposed response to, for example, a meeting invitation, does not match the first user ID in the first database 14, a refusal and possibly a security alert is sent by central ID server 12 to authentication server 20, and authentication server 20 does not accept the first user ID. In this example, a response to the meeting invitation is not permitted nor is the user permitted to join the meeting. A security alert can be sent to the first user device 16, a system administrator, the authentication server 20, a meeting host, or to any suitable location. In this example, the alert is preferably sent by central ID server 12 or by authentication server 20.

In another example, the function of authenticating the first user ID can be done by authentication server 20 querying two or more of central ID system(s) 12, identity server(s) 22, and first user device 16, when portions of the first user ID are stored in two or more of such components. For example, a user name may be stored in a first database 14, a user password may be stored in another first database 14, a part of a biometric data may be stored in a second database 24, another part of a biometric data may be stored in another second database 24, another part of biometric data may be stored in a first database 14, and/or a part of biometric data may be stored in first user device memory 16B.

None of the part or all of the first biometric data need be transmitted to central ID system 12 or stored in first database 14, but is stored only in one or more second databases 24 and/or in a memory 16B of first user device 16. In that case, authentication server 20 queries only one or both of identity server(s) 22 and first user device 16 to authenticate the one or more biometric data that is part of the first user ID. Again, if the first user ID is authenticated, the response to the authentication request is authenticated by authentication server 20 and the first user can access confidential information in server or databases. If the first user ID is not authenticated, the authentication server will not accept the response and an alert may be sent.

System 10 can be preprogrammed, and such programming can be changed, such as by first user device 16, to instruct authentication server 20 which other system components to query to obtain the biometric data in order to determine the first user ID.

The first user thus has the option at any time, using first user device 16 and GUI 16A of instructing identity server 22 to either (1) communicate all or part of biometric data to central ID system 12, (2) not communicate any of all or part of biometric data to central ID system 12, (3) to delete any or all of the biometric data from central ID system 12 and first database 14, (4) to delete or change any of biometric data in blockchain 28, (5) changing or deleting the biometric data in identity server(s) 22 and second database(s) 24, or (6) changing or deleting the biometric data in first user database 16B.

Another feature of system 10 or system 100 is that first user device 16, using GUI 16A or any suitable command function, can change or delete the biometric data in any one or more of the memory 16B of first user device 16, second database(s) 24 of identity server(s) 22, and first database(s) 14 of central ID server(s) 12, at any time. If user device 16 or identity server 22 does not communicate the biometric data to central ID system(s) 12, this lends an extra level of security to system 10 (or system 100) because the biometric data is only in first user device memory 16B and/or second database(s) 24 and is entirely under the control of the first user and not a centralized system. If the first user receives, such as through first user device 16, a message that there has been a security breach, the first user can immediately change or delete any of the biometric data by changing or deleting it from first user device memory 16B, and/or contacting identity server(s) 22 and having some or all of the one or more biometric data changed or deleted in second database(s) 24. This creates a new first user ID because the first user ID comprises the biometric data. The first user has the option at any time, using first user device 16 and GUI 16A of instructing identity server(s) 22 to either (1) communicate the one or more biometric data to central ID system(s) 12, (2) not communicate the one or more biometric data to central ID system(s) 12, (3) to delete any or all of the one or more biometric data from central ID system(s) 12 and first database(s) 14, (4) to delete or change any of the one or more biometric data in blockchain 38, or (5) changing or deleting the biometric data in identity server(s) 22 and second database(s) 24.

When the first user changes the biometric data, the original biometric data is referred to as a first biometric data and the changed (replacement) biometric data is referred to as the second one or more biometric data. If the first user changes or deletes the biometric data in identity server(s) 22 and second database(s) 24 and the biometric data is also stored in first database(s) 14, it will be changed or deleted in first database(s) 14 by identity server(s) 22 communicating with central ID system 12 or by first user device 16 communicating with central ID system(s) 12. Further, regarding system 100, if any of the biometric data is changed the change is also communicated to blockchain network 28 via first AA 26 of user device 16 communicating with blockchain API 16C. Regarding system 500 shown in FIG. 6, any change or deletion of the biometric data is communicated to the first user device 520 in a first AA 520B and API 520 to CTS 512, and/or by first user device 520 to identify server(s) 516 and centralized ID system(s) 525.

Turning to FIG. 2, system 100 is shown that is similar to system 10 except that it includes a blockchain component. The ordinary sequence of custody, control, transfer, analysis, and disposition of communications can be secured using the blockchain system 100 and method of FIG. 2, which does not rely on the principle of encryption (although encryption may be used), but instead makes use of smart or digital contracts that govern individual components of a response to a meeting invitation and may govern the meeting invitation. The method of system 100 has a blockchain security apparatus that integrates with authentication server 20. An authentication request is created by the authentication server 20 and identifies the "signer," which is either the identification of the authentication server, or the confidential information server or database 40, or user who initiated the authentication request. In one embodiment, the signer is the meeting server host who caused confidential device 40 to generate a meeting request, and then creates a trust basis using the last known information from the last authenticated meeting invitation from confidential device 40 or response thereto from the first user device 16 to form a digital contract. The digital contract includes a hashing process that authenticates (optionally) a request from confidential device 40, such as a meeting invitation, and the response to the request sent by first user device 16 by comparing the signature and identifications of the confidential device 40 (if this step is included in the method) and of the first user device 16 from the last authenticated response sent to authentication server 20. The hash, once created, only corresponds to the last authentication request or response; therefore, new authentication requests and/or responses may be stored and then the hash on the chain of requests and responses is updated accordingly.

As used with respect to system 100 or later defined system 500, unless stated otherwise, references to authentication server 20 or 518 with respect to authentication of a request include requests from authentication server 20, 518, confidential device 40, 540 and/or a second user device in communication with the confidential device 40 or authentication server 20, 518 that cause request to be sent.

System 100 includes a blockchain (BC) network 28 communicatively coupled with first user device 16 and with a first authentication agent (AA) 26 running on or in communication with first user device 16 via a blockchain API 16B. The BC network 28 is also communicatively coupled with a distributed application ("dApp") 30 (or the dApp 30 may be thought of as running in or on the BC network 28). The first user device's AA 26 is coupled with authentication server 20 through first user device 16.

The AA 26 of first user device 16 uses a plugin that leverages the blockchain API 16B to submit a response to an authentication request. These transactions trigger first distributed application 30 that authenticates and signs the response to the request with the first user ID 16. The API 16B returns the signed response to the first AA 26, which can then send the authenticated response to the authentication server 20. When the first user device 16 prepares a response to a request for authentication, by operation of first user device 16, the AA 26 uses the API 16B to authenticate the response before it can be sent to the authentication server 20.

Blockchain network 28 is used in the system 100, in part, because blockchain is made up of a time-stamped series of abiding records of data that are managed by a distributed cluster of computers (not centrally governed by any single server entity). Each block of data (in this case a block would be a request, such as a meeting invitation, to provide confidential information or a response to the request). Each requestor response may be encrypted and digitally contracted to one other using cryptographic principles (i.e., the chain). With the AA 26, the system 100 can organize content (here, requests, such as meeting invitations, and/or responses to the requests) according to a transactional purpose although it may only authenticate one individual request, such as a meeting invitation, or response at a time independently of other requests and responses. If the first user sends a response to a request, meeting invitation such as for authentication via AA 26 and first user device 16 to meeting server 20, the system 100 identifies the individual contribution (i.e., the response) of the first user and then applies a hashing process to encapsulate the discrete response using the blockchain technology.

The API 16B creates an identity on the blockchain 28 for the first user. The API 16B creates an account on the blockchain network 28 by generating a public/private key pair that includes the first user ID, which is created as discussed previously, and associating the public key with, for example, the first user's email address. An internet protocol or other first user device 16 could also be used. The public key/email address association is stored on the blockchain network 28. The private key is kept secure by the first user such as by storing in the operating system (OS) secure store accessible by or on first user device 16 using a key derivation function (KDF) or the like. Subsequent API 16B calls are authorized by requiring the first user to provide the private key associated with his/her email address other indicia of first user device 16. Second, the API 16B can store the first dApp 30. The first dApp 30 is initially downloaded to the blockchain network 28 and associated with the first user. The API 16B submits transactions to run the first dApp 30, and transactions are used to trigger the first dApp 30.

The first distributed application (or first dApp 30) acts to validate and sign response to a request, such as a meeting invitation, to access confidential information, wherein the response is created via the AA 26 with client device 16. Code can be stored on the blockchain network 28 and run on behalf of the creator. In system 100, this code is referred to as the first dApp 30. This code that runs on the blockchain network 28 can also be referred to as chaincode or a smart contract. There are many different blockchain implementations with varying features and capabilities. Depending on those capabilities, the specific details on where certain steps/functions are executed (e.g., the plugin for first AA 26, the API 16B, and the first dApp 30), and the use of off-chain data storage may vary to implement the system 100. In this non-limiting example, the first dApp 30 does the authentication and signing of iterative electronic communications, with no off-chain storage being used.

During operation of the system 100, the first user's first AA 26 has a plugin that uses the API 16B to submit the transactions containing a response to an authentication request, such as for a meeting invitation, wherein the response is generated by first user device 16. This transaction triggers the first distributed application 30 that runs on behalf of the first user device 16 in this instance to authenticate and sign the response. The API 16B returns the hashed and signed response to the first AA 26, which can then send the signed (and authenticated) response to the authentication server 20, which has a second AA 20B, or the second AA 20B may be associated with the confidential device 40 or the device of the user who initiated the communication for access to confidential information. When the first user receives a signed and hashed authenticated response, the plugin of the first AA 26 uses the API 16B to validate the response authenticated using the dApp 30. The blockchain API 16B validates the first user's identity when responses to authentication requests, such as for meeting invitations, are submitted.

The operation of an authentication system (such as system 100 of FIG. 2) during an authentication and signing process (i.e., the algorithms and techniques used by a system to authenticate messages using blockchain) are generally as follows. As a first step, the system 100 supports the first user creating a response to an authentication, such as one for a meeting request, sent by authentication server 20 in response to a request to access confidential information sent by confidential device 40. Next, the first user uses first AA 26 to execute the response send command. In response, a client-specific blockchain API plugin (which is API 16B for the first user device 16) is executed. As a next step, the system 100 performs an authentication of the content contained within the response by comparing a user ID associated with the response to the first user ID. The API 16B plugin creates a new blockchain transaction that triggers the smart contract (or dApp 30), and the response is authenticated if it includes the first user ID.

The authentication and sign process continues with the authentication server 20 receiving the authenticated response, in which case the authentication server 20's blockchain API 32 plugin, (or API plugin could be associated with confidential device 40 or with a device of a user who initiated the request to access confidential information) performs another authentication (e.g., "valid user or not?" By checking the blockchain identity with the first user ID). As a next step in the process, a data comparison tool (e.g., part of the second dApp 34 or another application provided in the system 100), such as a standard diff process, detects changes in the blockchain identity or the first user ID via blockchain network 28 and/or by verifying the first user ID using the process of system 10. The smart contract/dApp 30 applies heuristic rules on the validated content (e.g., meeting invitations and responses thereto) that prevents unauthorized changes to the content. As a next possible step in the process, the introduction of a new response by the first user device 16 (resulting from the data comparison tool) leads to a recalculation of the hash. The process continues with the transaction being completed, and the authenticated response stored in the blockchain network 28 is returned to the first client device 16's first AA 26. In some cases, an identifier (icon, message, or combination thereof) of the security status is created to certify (e.g., a green button/light) or to decertify (e.g., a red stop sign symbol or light) an authentication request or response. As part of the process, the system 100 may store the authentication requests and responses that include the hashing annotations, e.g., in the third database 36 of authentication server 20 or at any suitable location. The process continues by repeating the process with the next authentication request to the first user device 16 and/or response to a new authentication request being sent.

The combination of a signed hash, the first user ID (defined above), and a block number is appended to the bottom of each (optionally, request) and response generated by the system 100. Fourth, start block and end block markers with a block number may be placed at the start and end of the hash protected block (i.e., an authentication request or response).

Authentication server 20 confidential device 40, or the device of a user who initiated a request) has a second AA 20B that functions in the same manner as first AA 26 but authenticates, signs, and hashes authentication requests, such as meeting invitations, before being sent to first user device 16. Blockchain API 32 functions in the same manner as blockchain API 16B by, in part for example, checking the accuracy of the meeting host ID before permitting a meeting invitation to be sent to first user device 16. Second distributed application (dApp) 34 functions in the same manner as dApp 30, but in connection with authentication server 20, confidential device 40, or a second user device) instead of first user device 16. The other components of system 100 are the same as, and can function in the same manner as those related to first user device 16 in system 100, or as described in system 10.

Figure 3:
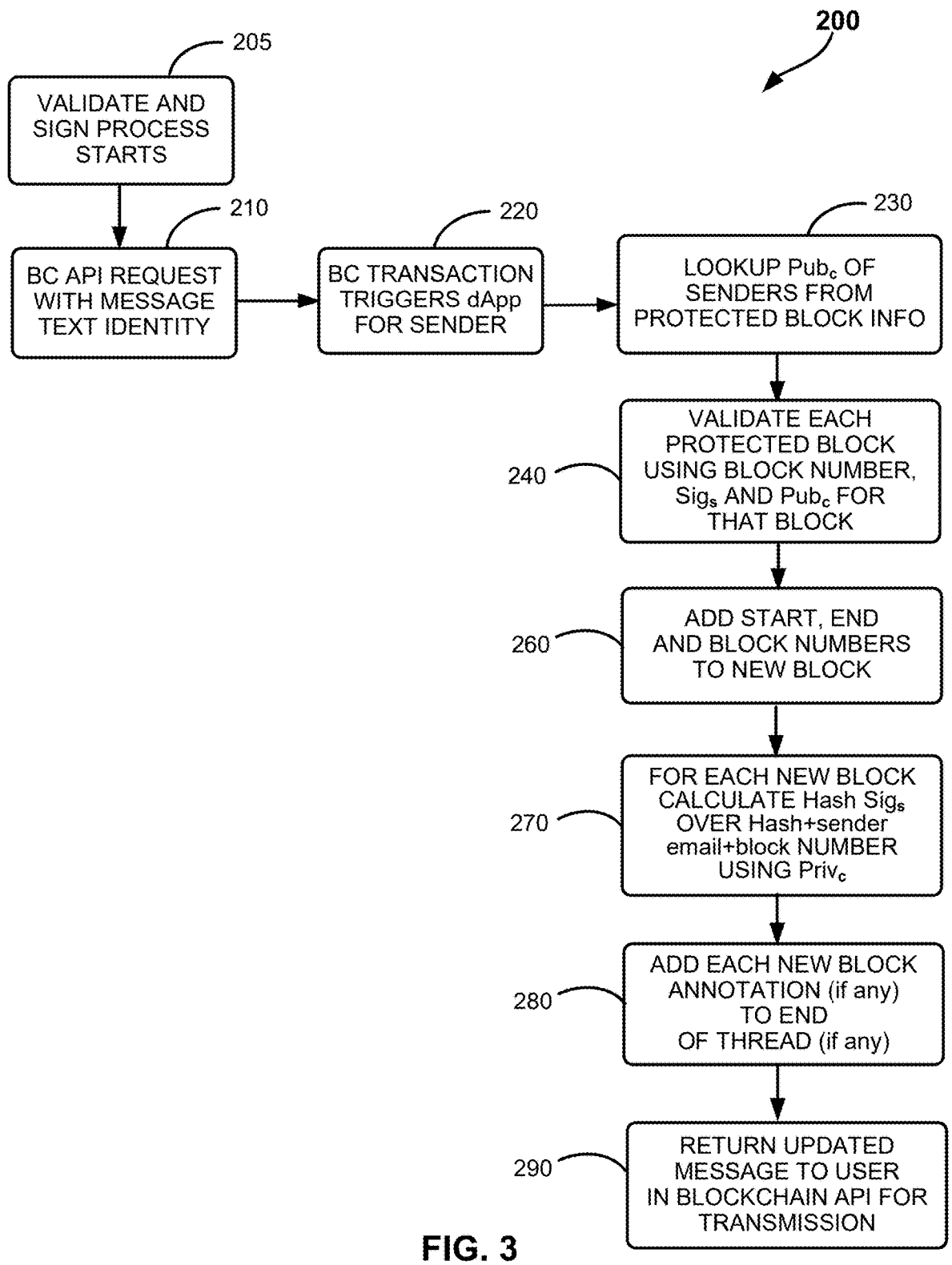
FIG. 3 illustrates a block diagram of electronic, computerized process utilizing blockchain concepts according to this disclosure.

FIG. 3 is a flow diagram of a blockchain-driven process 200 for providing certification of authentication requests, such as those for meeting invitations, and responses thereto. The method 200 starts at step 205 such as with providing a blockchain plugin 32 for authentication server 20 or confidential device 40 and for each AA in user devices participating in communications and with user device each establishing an authentication and signing account (as discussed above with reference to FIG. 2). The method 200 continues at step 210 by generating a blockchain API request that includes a message, such as a meeting invitation, that has been authenticated. At step 220, the BC transaction triggers the distributed application (e.g., dApp 30 in FIG. 2) for the first user device 16.

Then, at step 230, the first dApp 30 looks up the public key (Pubc) of authentication server 20 or confidential device 40 from the protected block information at the end of the authentication request, with the public key being a Curve25519 public key in some implementations. The public key is typically in the identity transaction for the authentication server 20 a confidential device 40 address. The method 200 continues at step 240 with the dApp 30 authenticating the authentication request, such as a meeting invitation, using the block number, the public key (Pubc), and signature (Sigs). Each "protected block" is a block of an authentication request, such as a meeting invitation, or response from the first user device 16 with start and end markers and block number where the block number references an annotation at the end. The signature may be equal, in some implementations, to Ed25519 calculated over hash+e-mail+block number using the converted private key, PrivS (which may be the Curve25519 private key). The protected block may contain start and end markers as well as the block number.

The method 200 continues at step 260 with adding the start marker, the end marker, and the block number to each new block, which is either an authentication request, such as a meeting invitation, or response thereto. Then, at step 270, for each new block, the hash and signature (Sigs), are calculated over the hash+sender e-mail+block number using the private key, Privs. Typically, the first user's private key is part of the first dApp 30. Next, the method 200 continues at step 280 with adding each new block annotation to the end and, at 290, with returning the updated message to the first user's first AA 26 via the blockchain API 16B.

The blockchain (or blockchain network 38) transactions include: (a) creating an identity for each user (that for the first user includes the first user ID); (b) verifying identities;

(c) creating authentication requests, such as for meeting invitations; and (d) sending responses to authentication requests, such as for meeting invitations. Each blockchain API acts to: (a) submit each authentication request, such as a meeting invitation, or response to an authentication request; (b) verify the identity of the sender; and (c) permit the transmission of a meeting invitation or permission to access confidential information, or a response, if the sender's user ID is authenticated, and block a communication if the user ID is not authenticated. Each contribution by the authentication server in sending an authentication request, such as a meeting invitation, and response by the first user device may be contained in a separate block, which is annotated with a hash of enclosed content, with the identity of the smart contract (SC) (or dApp 30 or 34) that signed the block, and a digital signature.

When an authentication request, such as a meeting invitation, or response thereto is submitted to the blockchain network 28, the SC/dApp of the sender validates and updates the signature. The hash is used to store a copy of the authentication request or response off chain. The submitting blockchain API 16B or 32 returns the signed authentication request or response to first user device 16 or authentication server 20. The first AA 26 of first user device 16 or second AA 20B of authentication server 20 then sends the authentication request or response to the appropriate recipient. With regard to the reply and validation of updates, the SC/dApp uses the hash contained in the outer annotation to retrieve the last validated version of an authentication request from the authentication server 20 or a response from the first user device 16. The SC/dApp performs a data comparison process of the submitted request/response and last request/response. The SC/dApp verifies that new authentication request or response has the same user ID as prior authentication requests or responses. The transaction is not permitted if authentication fails. A new response to an authentication request, if authenticated, is annotated and signed by the SC/dApp of the user (such as the first user) that sent the response.

Figure 4:
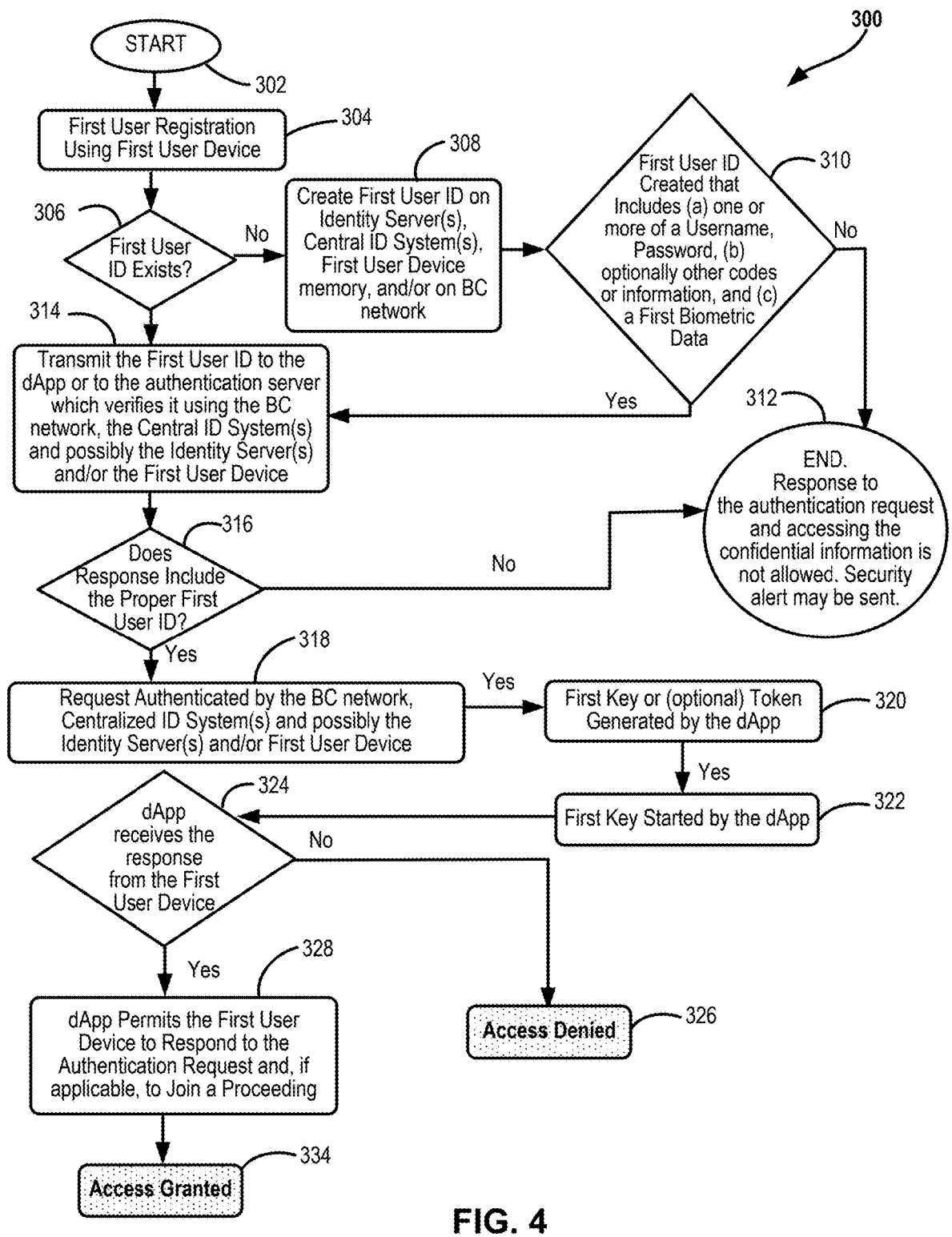
FIG. 4 illustrates a block diagram of electronic, computerized process according to this disclosure.

Turning now to FIG. 4, a procedural flow 300 for a blockchain authentication system of this application is shown. At step 302 the method 300 begins. User registration using, in this example, a first user device 16, occurs at step 304. Users initiate registration, and their details are securely sent to the blockchain 28. At step 306 the system 100 determines if a first user ID exists. If it does not exit, at step 308 the first user ID is created on identity server 22, central ID server 12, first user device memory 16B, and/or on BC network 28, as previously described. At step 310 the first user ID is created that includes a username, password, potentially other codes or information, and biometric data of the first user, all as previously described. If the first user ID is not created, a response to an authentication request, such as a meeting invitation, or attempt to join a meeting are not allowed at step 312. If a first user ID exists at step 306 or is created at step 310, at step 314 the first user ID is transmitted to the dApp, which verifies it such as by querying the central ID server 12, the identity server 22, the first user device memory 16B, or by querying a blockchain network, such as network 28. If a response at step 316 includes a proper user ID, it is authenticated at step 318. If the response does not include the proper user ID, the method ends at step 312. If blockchain is used, a first key or token may be issued at step 320 and the first key is started by the dApp 30 at step 322. If the dApp 30 receives an electronic response from the first user device 16 at step 324, the dApp 30 permits the first user device 16 to respond to an authentication request, such as one for a meeting invitation, and to join the meeting (if desired) at step 328. Access is granted at step 334. If the dApp 30 does not receive an appropriate electronic communication from the first user device 16, access is denied at step 326.

Figure 5:
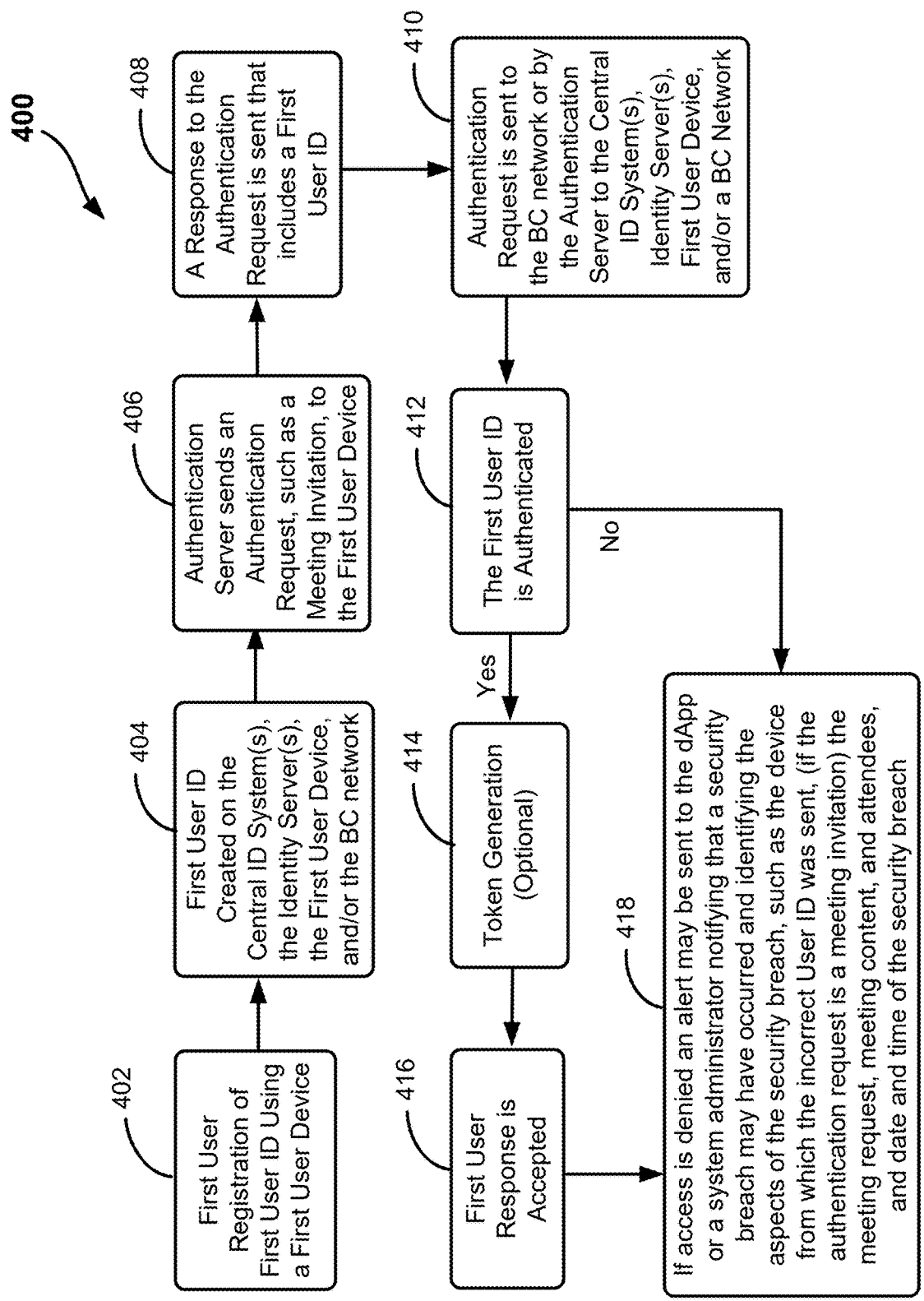
FIG. 5 illustrates a block diagram of electronic, computerized process according to this disclosure.

FIG. 5 depicts a method 400. At steps 402 and 404 a first user registers a first user device 16 and creates a first user ID on the central ID system(s) 12, the identity server(s) 22, and/or first user device memory 16B as previously described. At step 406, the meeting server 20 sends an authentication request, such as for a meeting invitation, to the first user device 16. At step 408, a response to the authentication request is sent by first user device 16 that includes the first user ID. An authentication request is sent by the authentication server 20 to the central ID system(s) 12, possibly to the identity server(s) 22, and the first user device memory 16B, at step 410. If the first user ID is verified at step 412 an optional token is generated at step 414. The first user access is granted or denied at step 416. If access is denied at step 418 an alert may be sent to one or more of various system locations.

Using Tuple Spaces

Tuple spaces may also be used for this type of authentication because they eliminate the need to save chains of transactions associated with blockchains. A cryptographic hash applied by an AA can be used to verify the authenticity of a new electronic communication, and only a current cryptographic hash associated with a new (or first) single electronic communication, such as an authentication request, such as for a meeting invitation, or response to an authentication request, need be checked to authenticate the electronic communication.

Figure 6:
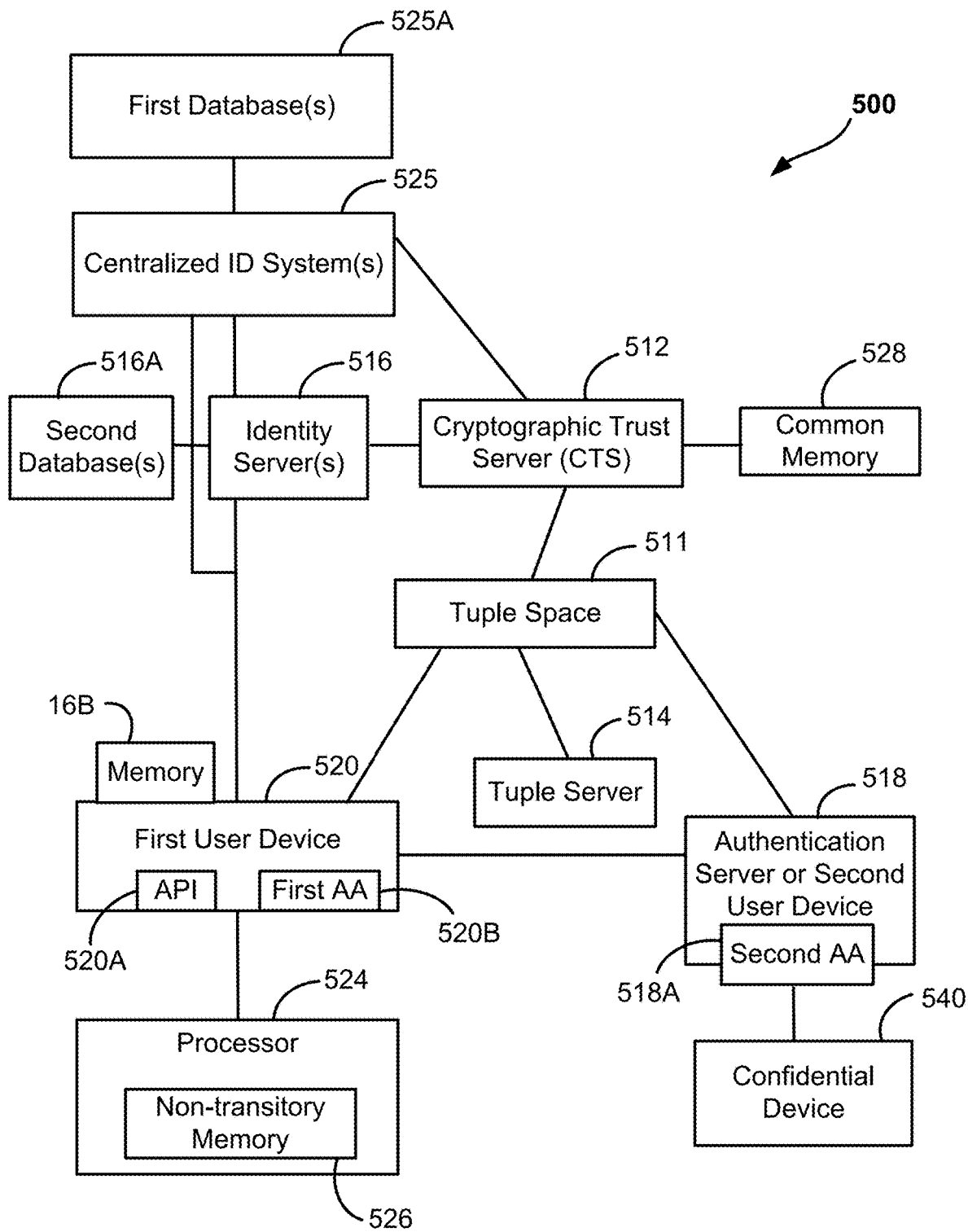
FIG. 6 illustrates an alternate cloud-based or server-based computerized system of this disclosure that utilizes tuple spaces.

Turning again to the figures, wherein the purpose is to describe embodiments of this disclosure and not to limit the scope of the claims, FIG. 6 shows a computer system 500 that comprises a cryptographic trust server (CTS) 512 and a tuple server 514, which is configured to generate one or more tuple spaces, such as tuple space 511. CTS 512 includes or communicates with at least (1) the common memory 528 configured to temporarily (preferred) or permanently store one or multiple authentication requests, such as ones for electronic meeting invitations, (2) a tuple space 511 generated by tuple server 514 to hold authenticated confidential information access invitations, such as electronic meeting invitations, as well as pointers to each invitation, and/or to the locations of each authenticated response to a meeting request, and (3) a processor 524 having a non-transitory memory 526 to perform the operations described herein.

The tuple server 514 may be part of CTS 512, or be a separate device, or be part of any suitable device of system 500. A first user device 520 is any suitable electronic device, such as a computer or cell phone, capable of sending and receiving electronic communications. First user device 520 has an API 520A in communication with a centralized ID system(s) 525 and with identity server(s) 516, which is configured to transmit electronic communications (also referred to herein as messages) between user devices.

Authentication server (or a second user device, which can be a meeting host device) 518 is any suitable electronic device, such as a computer or server, capable of sending authentication requests, such as for conference invitations, and receiving responses thereto from first user device 520. Any number of user devices in addition to first user device 520 may be utilized in a system 500 or method it enables. Each user creates an account on system 500, such as with CTS 512, by generating a private key, or a public/private key pair, which includes a user ID as previously described having both of (1) a username, password, and/or other codes or information, and (2) user biometric data. If a public key is generated it is associated with an address, such as an email address, associated with the user's user device, such as first user device 520. The public key is stored and is accessible by CTS 512. The private key is accessible by or stored in CTS 512 and is kept secure by the user such as by storing it in an operating system (OS) secure store accessible with or on the user's user device using a key derivation function (KDF) or similar technology.

A common memory 528 is in communication with, or is part of, CTS 512, and is in communication with first AA 520B and second AA 518A, and/or first user device 520 and authentication server 518, and CTS 512. A confidential device 540 is in communication with authentication server 518 and performs in any manner as previously described confidential device 40.

Tuple space 511, when generated by tuple server 514, is resident on either first AA 520B and/or second AA 518A, CTS 512, tuple server 514, or on any suitable device of system 500 so that at least one AA 520B or AA 518A and CTS 512 can communicate with tuple space 511.

The tuple space 511 is configured to receive one or more of (1) an alert from an AA 520B or AA 518A to notify the CTS 512 that (1) a new authentication request, such as one for a meeting invitation, has been placed in common memory 528, or (2) a new response from first user device 520 to an authentication request has been placed in common memory 528, and (3) the location of the new authentication request or response in the common memory 528. In another embodiment, the tuple space 511 may receive an AA cryptographic hash generated by AA 520B or AA 518A using its private key or its private key and public key, and/or possibly an electronic (or digital) signature placed on a new electronic communication by an AA 520B or AA 518A.

In operation, a user uses either first user device 520, or authentication server 518 operates, to generate a response to an authentication request or an authentication request. The first AA 520B or second AA 518A places an AA cryptographic hash, respectively, on the response or the authentication request utilizing the respective private key or the respective private key and public key. Either the AA 520B or AA 518A, or the first user device 520 or authentication server 518, place the authentication request or response with the AA cryptographic hash into the common memory 528. AA 520B or 518A then place into tuple space 511: (1) an alert for CTS 512 and the location of the new authentication request or response in the common memory 528, or (2) an alert for CTS 512 and the location of each response to an authentication request by a user, including a new authentication request or response, in the common memory 528.

CTS 512, in response to the alert placed in the tuple space 511, accesses the new authentication request or response in common memory 528 and verifies the AA cryptographic hash by comparing it to the known AA private key or private key and public key values. The CTS 512 can also verify the authenticity of a prior response by the user in an iterative electronic communication thread by verifying the CTS hash that the CTS 512 previously placed on the authentication request thread or a user's response thread, wherein the previous CTS hash value can be stored by the CTS 512 in the common memory 528, or at any suitable location in system 500. If the authenticity of the AA cryptographic hash on the new user response, and optionally the CTS hash on the entire thread of prior electronic responses, is verified, CTS 512 places a new CTS hash over either the new user response or the entire thread of user responses, including the new authentication request or response added to the thread, to verify that the thread is authentic. This permits an AA 520B or AA 518A or first user device 520 or meeting server 518 to send and/or receive the authenticated user response to an authentication request. Preferably, CTS 512 places an alert in tuple space 511 to notify AA 520B or AA 518A that the new communication (e.g., an authentication request or response) or an entire thread of an authentication requests or responses by the first user, including the new authentication request or response, is authenticated, which then communicates to AA 520B or AA 518A to send or receive the invitation to access confidential information, such as a meeting invitation, or response.

If the authenticity of the meeting invitation or response is not authenticated CTS 512 does not place its own hash over the entire electronic authentication request or response thread (if a thread is being transferred rather than a single authentication request or response) including the new authentication request or response to authenticate the thread, and does not permit an AA 520B or AA 518A or first user device 520 or authentication server 518 to transmit and/or receive, respectively, an invitation to access confidential information or a response.

CTS 512 or AA 520B, AA 518A may also send an alert, as explained herein, if an individual invitation or individual response to an invitation, or the invitation thread or response thread is not authenticated. Once CTS 512 has verified or not verified the new invitation or response, or the electronic thread including the new invitation or response, the electronic communications in common memory 528 may be deleted or removed. Thus, the individual invitation and/or individual response, or iterative threads, need not be stored. Further, the tuple space 511 need not store any information after the authentication or non-authentication of an individual meeting invitation or response, or of an iterative thread including a new meeting invitation or response, is complete and any alerts are posted.

Figure 7:
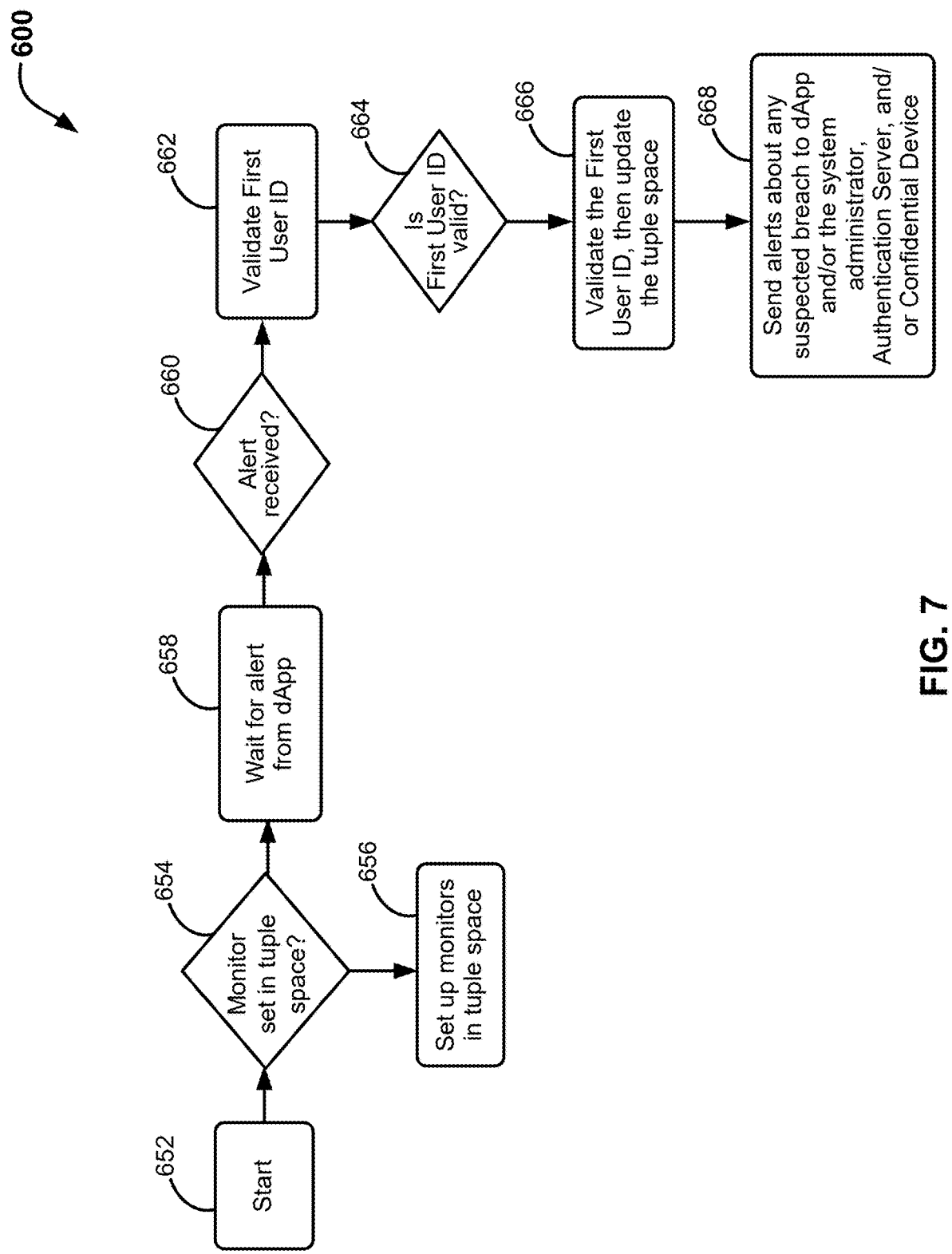
FIG. 7 illustrates a block diagram of a computerized method according to this disclosure for the certification of users by using tuple spaces.

FIG. 7 shows an exemplary computer method 600 of this disclosure. Method 600 starts at step 652 by a user adding a new response to an authentication request for an electronic invitation. At step 654, the AA 520B or 518A hashes and digitally signs the new response utilizing its private key. A tuple space 511 is generated by tuple server 514, and the tuple space 511 is in communication with an AA, such as AA 520B or AA 518A. At step 658, the AA 520B or AA 518A places the new response in the common memory 528 and places an alert in the tuple space 11 notifying CTS 512. The AA 520B or AA 518A may also place one or more of the (1) AA's cryptographic hash identifier, (2) location of the new contribution in the common memory 528, and (3) location of each individual invitation or response an iterative electronic communication thread (if such a thread is being verified) into the tuple space 511 to be accessed by CTS 512.

At step 660, the alert is received by the CTS 512 and at step 662, CTS 512 determines if the new invitation or response is valid by reviewing its AA cryptographic hash against the AA private key or AA private key and public key, which are stored and accessible by the CTS 512 in any suitable manner. CTS 512 can also verify the prior electronic communications (invitations and responses) in an iterative electronic communication thread to ensure that the thread has not been altered by verifying whether the CTS hash that was previously placed on the thread of prior electronic communications is still there, or if it has been removed or replaced with a different hash. This step, however, is not required. CTS 512 can verify the CTS hash by comparing it to a known, stored value for the CTS hash. If the CTS hash has been removed or replaced with a different hash, or is otherwise tampered with, the CTS 512 does not verify the iterative electronic communication thread.

If the new contribution is authentic, at step 666 the new contribution is hashed by the CTS 512 and the new contribution is digitally signed by the AA 520B or AA 518A. The tuple space 511 is updated with an authentication transmitted by the CTS 512 to the AA 520B or AA 518A that permits the AA 520B or AA 518A to send or receive the invitation or the response. The AA 520B or AA 518A may further await permission from the CTS 512 to send and/or receive the new response or the iterative electronic communication thread including the new invitation or new response.

At step 668, if the new invitation or new response to a invitation is not validated by CTS 512, an alert of a security breach is sent via tuple space 511 to the AA 520B or AA 518A, and the new response will not be transferred to authentication server 520. An alert may also be sent by the CTS 512 or an AA 520B or AA 518A, directly or indirectly through tuple space 511, to a system administrator, wherein the alert could include the identity of the user device from which the non-authenticated response originated, the content of the non-authenticated response, and the date and time the non-authenticated response was generated.

Figure 8:
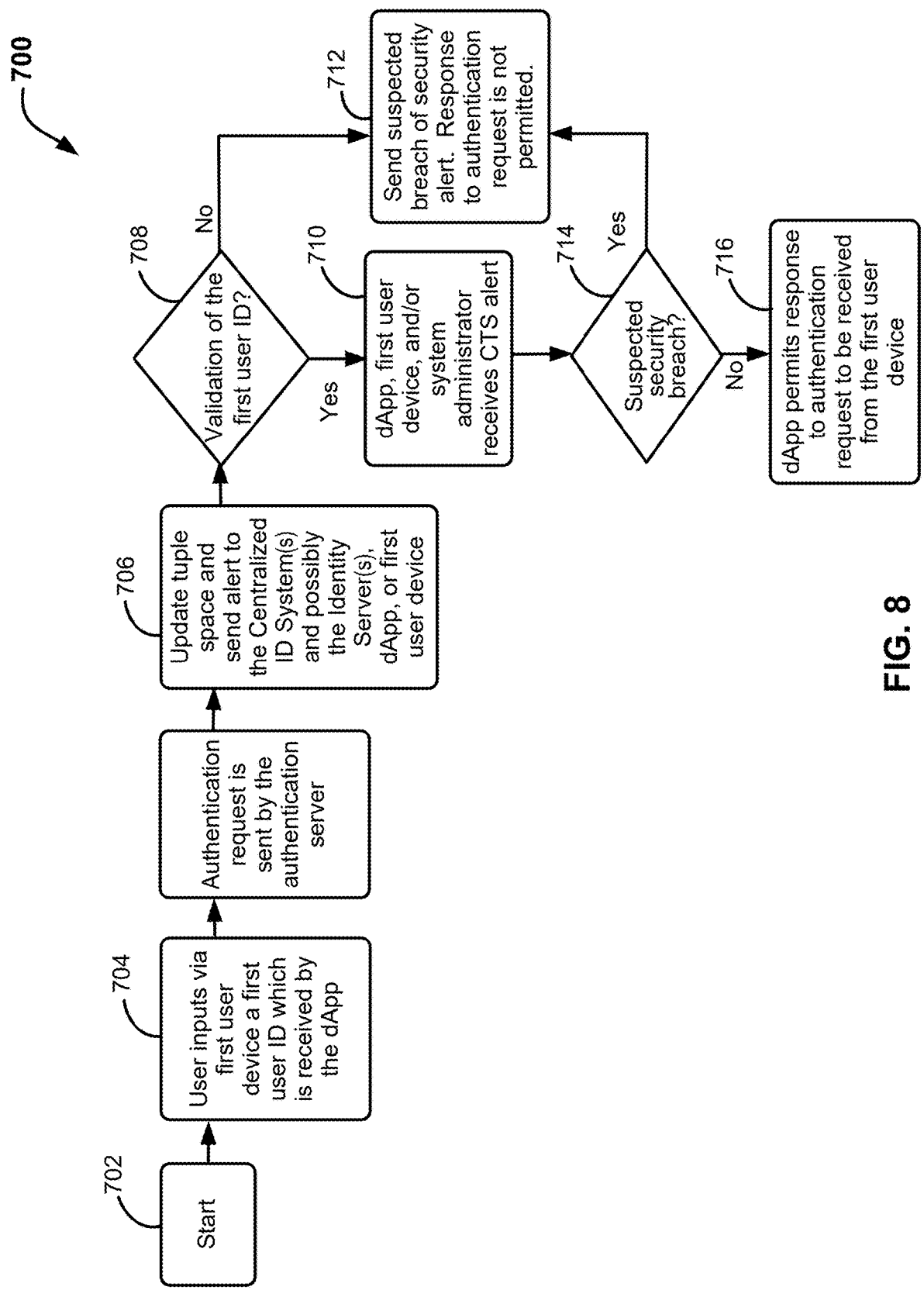
FIG. 8 shows an alternate block diagram of a computerized method of certifying users by using tuple spaces.

In FIG. 8 another exemplary computer method 700 of this disclosure is illustrated. The method starts at step 702. At step 704 a user inputs via a user device, such as user device 516, a new invitation to access confidential information or new response to an invitation. The AA 520B or AA 518A at step 706 adds a hash and digital signature to the invitation or response, which is placed in tuple space 511 at step 708 and sent to the CTS 512 at step 710 for authentication.

If the CTS 512 does not authenticate the information in the tuple space 511, at step 112 a CTS 512 alert is sent to the AA associated with the user device, such as first user device 520 or authentication server 518, from which the invitation or response, respectively, was created, and the invitation or response is not transmitted. As described above, a system administrator may also be notified of a security breach. If the CTS 512 validates the invitation or, respectively, response at step 714, the invitation or response is sent by the appropriate AA to the first user device 520 or to meeting server 518.

At step 716, the CTS 512 may identify a security breach and pull a security trigger, which can be any type of alert, at step 718.

Figure 9:
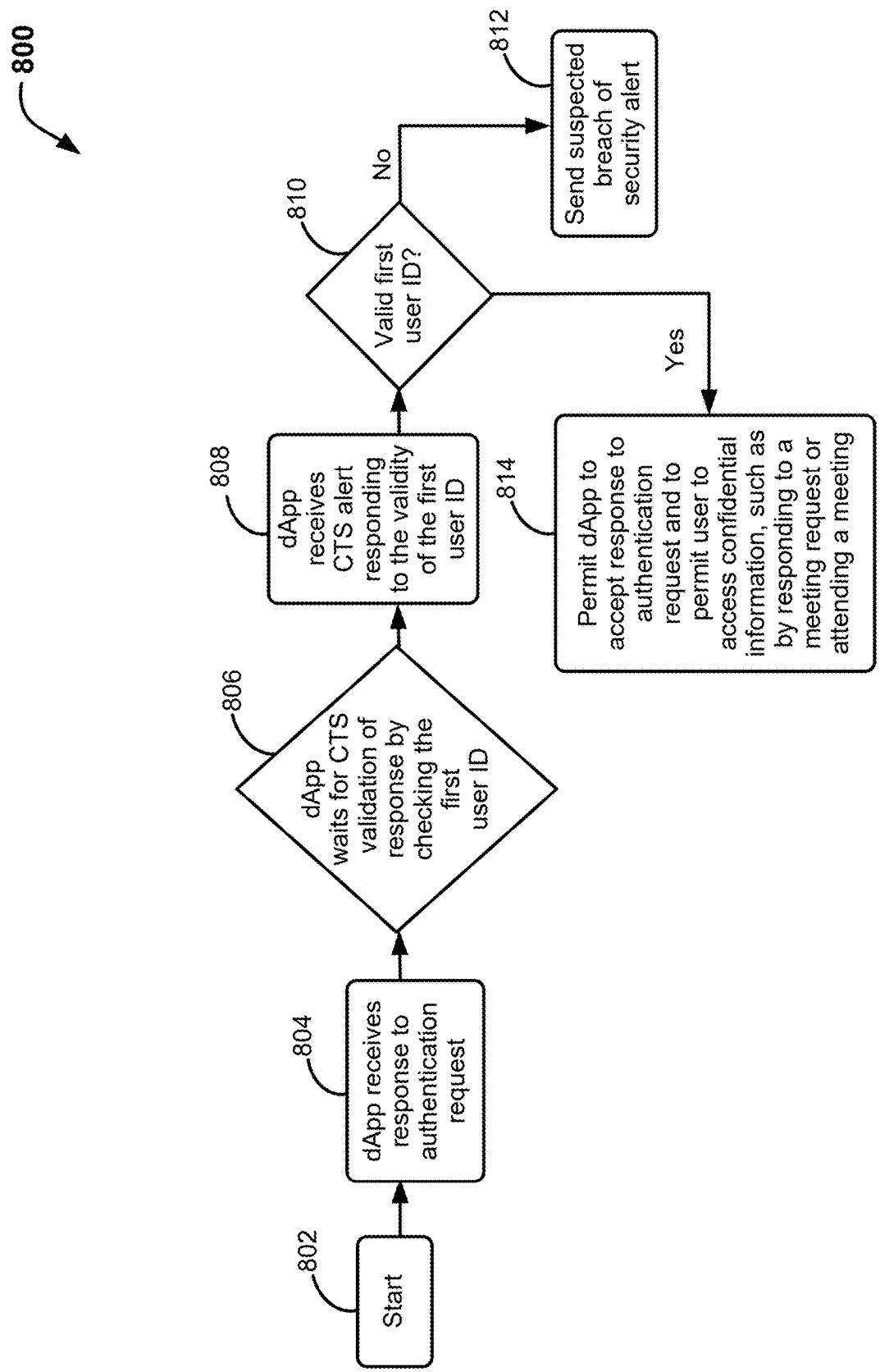
FIG. 9 shows an alternate block diagram of a computerized method for certifying users by using tuple spaces.

FIG. 9 shows another exemplary computer method 800. Method 800 starts at step 802 and at step 804 a user device, such as first user device 520, receives an invitation to access confidential information. At step 806, the AA 520B associated with the first user device 520 receives the invitation. The AA 520B forwards an alert and location in common memory 528 of the new invitation to tuple space 511, where the new invitation is accessible by CTS 512 for validation by checking its AA cryptographic hash. At step 808, the CTS 512 alerts the AA 520B or AA 518A through the tuple space 511. If the new invitation is authentic, at step 810, the new invitation is presented to a user via first user device 520 at step 814. If the new invitation is determined by the CTS 512 to not be authentic, a security trigger is pulled at step 812.

An Overall Workflow Example Using Tuple Spaces

A user makes a new contribution (such as a meeting invitation or response to a meeting invitation) through his/her user device, which is in communication with an AA.

The AA 520B or AA 518A hashes the contribution using its private key, signs the contribution with a digital signature that includes the first user ID or at least the biometric data of the user, and updates the tuple space 511 with the cryptographic hash and an alert for the CTS 512.

The CTS 512 authenticates the cryptographic hash, and possibly the digital signature and, if valid, updates the tuple space 511 with the authentication, which is accessible by the AA 520B or AA 518A.

If the new contribution is not authentic, breach procedures are triggered by the CTS 512 and/or AA 520B, and alerts are sent.

In some implementation, the CTS 512 will alert the sending AA 520B or AA 518A that the contribution is authentic as a form of permission for the AA 520B or AA 518A to send it.

In some implementations, if the contribution is authentic, the CTS 512 will alert the destination AA 520B or AA 518A that a contribution it will receive is authentic to avoid the case in which an unauthentic contribution may be entered by bypassing the CTS 512 function.

If the contribution is unauthentic, the CTS 512 will trigger breach procedures. This can include setting an alert in the tuple space 511 so that other system applications may take action. It could also include informing the sending and recipient AAs 520B and 518A so that one or more may take action and/or send an alert to a system administrator that may include information regarding any unauthentic communication.

Once an electronic communication has been authenticated and transmitted, nothing need be saved in the tuple space 511 or the common memory 528. Further, if the CTS 512 discovers a security breach, nothing need be stored after the appropriate security protocol is complete.

Possible Variations

In some implementations, AA 520B or AA 518A could wait for permission from the CTS 512 to send an invitation or response only after it has been authenticated. In other implementations, AA 520B or AA 518A could automatically send an email after the user creates it, and its integrity is authenticated by a second AA in communication with the CTS 512 when received at a second device, such as first user device 520 or the authentication server 518.

In summary, the system and method of this disclosure improves the issues of inefficiencies and security flaws in conventional centralized authentication for online meetings. It provides a decentralized, transparent (and optionally cryptographic) solution that boosts security and lessens reliance on centralized authority.

The description of embodiments provided herein is merely exemplary and is intended for purposes of illustration only; the following description is not intended to limit the scope of the claims. Moreover, recitation of multiple embodiments having stated features is not intended to exclude other embodiments having additional or fewer features or other embodiments incorporating different combinations of the stated features. The methods and systems according to this disclosure and claims can operate in a premise, cloud-based, or hybrid environment.

The features of the various embodiments may be stand alone or combined in any combination. Further, unless otherwise noted, various illustrated steps of a method can be performed sequentially or at the same time, and not necessarily be performed in the order illustrated. It will be recognized that changes and modifications may be made to the exemplary embodiments without departing from the scope of the present invention. These and other changes or modifications are intended to be included within the scope of the present invention, as expressed in the following claims.

The present invention has been described above with reference to a number of exemplary embodiments and examples. It should be appreciated that the particular embodiments shown and described herein are illustrative of the invention and its best mode and are not intended to limit in any way the scope of the invention as set forth in the claims. The features of the various embodiments may stand alone or be combined in any combination. Further, unless otherwise noted, various illustrated steps of a method can be performed sequentially or at the same time, and not necessarily be performed in the order illustrated. It will be recognized that changes and modifications may be made to the exemplary embodiments without departing from the scope of the present invention. These and other changes or modifications are intended to be included within the scope of the present invention, as expressed in the following claims.

The invention claimed is:

1. An electronic authentication system for authenticating a sender of an electronic communication in response to an authentication request, wherein the electronic authentication system comprises:
   a authentication server configured to generate an authentication request;
   a blockchain network;
   a first user device associated with a first user and having a first authentication agent (AA) and a first user application programming interface (API) that is in communication with the blockchain network;
   one or more central ID servers, wherein each of the one or more central ID servers has a first database configured to store one or both of a username and password associated with the first user, wherein the one or more central ID servers are in communication with the first user device and with the authentication server;
   an identity server in communication with the first user device and having a second database, wherein the identity server is configured to receive all or part of a first biometric data of the first user and store the all or part of the first biometric data in the second database;
   wherein the first user device is configured to create a first user identity that includes (a) one or more of the username and the user password stored on the one or more first databases, and (b) the all or part of the first biometric data of the first user that is stored in the second database;
   wherein the first user device accesses the blockchain network by transmitting by the first AA a request to the blockchain network to authenticate the first user ID; and
   a first distributed application storing a blockchain key associated with the first user, wherein the blockchain key includes the first user ID, and wherein the first distributed application receives a response to an authentication request from the first user device, and in response, creates a certified version of the response by generating a hash and signature with the blockchain network based on the blockchain key, and transmits the certified version of the response to the first user device for transmission to the authentication server to respond to the authentication request.

2. The electronic authentication system of claim 1, wherein the electronic communication is one of a conferencing session communication, a messaging communication, a social media communication, and an order transaction communication.

3. The electronic certification system of claim 1 that further comprises a meeting server in communication with the authentication server, and a second distributed application storing a blockchain key associated with a user of the meeting server, wherein the second distributed application receives a meeting invitation from the meeting server that includes information provided by the user of the meeting server, and wherein the second distributed application creates a certified version of the meeting invitation from the meeting server by generating a hash of the meeting invitation and a signature with the blockchain network based on the blockchain key associated with the user of the meeting server, and transmits the certified version of the meeting invitation back to the meeting server for transmission with a signature portion that includes the hash and the signature for the user of the meeting server.

4. The electronic certification system of claim 1, wherein the first user can change the all or part of the first biometric data to an all or part of a second biometric data by sending a command to the identity server, wherein the command includes (a) the first user ID, and (b) the all or part of the second biometric data, and the identity server saves the all or part of the second biometric data in the second database, and communicates the change from the all or part of the first biometric data to the all or part of the second biometric data to the blockchain network.

5. The electronic communication system of claim 1, wherein the first user device is further configured, upon receiving a command from the first user, to delete the all or part of the first biometric data from the identity server, from the first user ID, from the central ID system, and from the blockchain network.

6. The electronic communication system of claim 1, wherein the all or part of the first biometric data is one or more of facial recognition, vascular signature, fingerprint, iris recognition, palm print, the first user's voice, a white noise, brainwave signatures, and the first user's gait.

7. The electronic communication system of claim 1, wherein the first user enters the all or part of the first biometric data into the first user device, which transmits the all or part of the first biometric data to the identity server, which saves the all or part of the first biometric data in the second database, and transmits the all or part of the first biometric data to the blockchain network.

8. The electronic communication system of claim 1 that further includes the blockchain network sending a key to the first user device when the first user ID is verified by the blockchain network.

9. The electronic communication system of claim 8, wherein the first user device further transmits the key to the authentication server in order to respond to the authentication request and to access a confidential information sever or database.

10. The electronic authentication system of claim 3, wherein the meeting server comprises an AA, and wherein the AA of the first client device communicates the response from the first user device to the first distributed application, and the AA of the authentication server communicates the meeting invitation from the authentication server to the second distributed application associated with the user of the authentication server.

11. A computerized method of certifying a user as an originator of a response to an authentication request, the computerized method comprising the steps of:
   creating, using a first user device, a first user ID that includes a first username, a first user password, and a first biometric data;
   saving the first username and first user password on a first database of a central ID server;

transmitting the first biometric data to an identity server, wherein the biometric data is stored in a second database;

transmitting the first user ID to a blockchain network;

sending an authentication request to the first user device by an authentication server;

a first AA of the first user device accessing a first distributed application and sending a response from the first user device to the authentication request;

the blockchain network validating the first user ID or not validating the first user ID by comparing the first user ID to a value stored in either (a) the blockchain network, or (b) a second database of the identity server and a first database of the central ID system; and if the first user identity is validated by the blockchain network, the first distributed application (a) generating and storing a first blockchain key associated with the first user, (b) in response to the first user's response to the authentication request, creating by the blockchain network a first certified version of the response by generating a first hash and a first signature that include the first user ID based on the first blockchain key, and (c) transmitting the first certified version of the response with a signature portion including the hash and the signature to the first AA of the first user device to transmit to the authentication server.

12. The computerized method of claim 11, wherein if authentication fails, the first distributed application marks the response to indicate that the first user device is untrusted.

13. The computerized method of claim 11, further comprising the steps of, if the response is authenticated, using the blockchain network to provide a private key associated with the response to the first AA via the first distributed application, wherein the private key is provided to the first user device and used to respond to the authentication request and to access a confidential server or database.

14. The computerized method of claim 11, wherein if the response is validated, further comprising the step of the first distributed application adding an annotation at an end of the certified version of the response, wherein the annotation includes the first hash.

15. The computerized method of claim 14, wherein if the response is validated, further comprising the steps of the first distributed application adding to the certified version of the response (a) a digital signature that includes the first user ID, (b) a block number assigned to the response, and (c) the identity of the first user or the first user device.

16. The computerized method of claim 11, wherein the first user device is configured to (a) delete the first biometric data from the second database of the identity server, the first database of the central ID system, and the blockchain network, or (b) change the first biometric data to a second biometric data in the second database of the identity server, the first database of the central ID system, and from the blockchain network.

17. An electronic apparatus comprising at least (a) a blockchain network, (b) a first distributed application coupled to the blockchain network, (c) a first user device associated with a first user and having (i) a first authentication agent (AA), and (ii) a first application programming interface (API), wherein the AA is in communication with the first distributed application, (d) an identity server in communication with the first user device, (e) a central ID server in communication with the first user device, and (f) one processor and a tangible, non-transitory memory configured to communicate with the processor, the non-transitory memory having stored thereon instructions which, when executed by the processor, are configured to cause the electronic apparatus to execute a method including the following steps:

creating by the first user device a first user ID that comprises a user password, and a first biometric data, wherein the user password is created in the central ID server and stored in a first database, and the first biometric data is transmitted to the identity server by the first user device and is stored in a second database, and the first user ID is transmitted to the blockchain network;

the first distributed application receiving from the first AA a response from the first user device to an authentication request sent by an authentication server;

upon receiving the request, the first distributed application comparing the first user ID to a stored value in the blockchain network in order to authenticate or not authenticate the identity of the first user; and if the response is authenticated, the first distributed application (a) generating a first blockchain key for the response and creating a first certified version of the response by the blockchain network generating a first hash and a digital signature based on a first blockchain key, and (b) transmitting the first certified version of the response to the first AA for further transmission by the first user device to the authentication server.

18. The electronic apparatus of claim 17, wherein the method further includes a meeting server in communication with the authentication server, and that further includes the step of the blockchain network or the first distributed application assigning an access level to the first user, wherein the access level determines (a) whether the first user may join a meeting referenced in a meeting invitation sent by the meeting server, and (b) if the first user can join the meeting, the level of interaction the first user is permitted in the meeting.

19. The electronic apparatus of claim 17, wherein the content of the certified version includes a block that is numbered by the first distributed application.

20. The electronic apparatus of claim 17, wherein the first user can utilize the first user device and the first AA to delete from or change the first biometric data in the identity server and in the blockchain network.

* * * * *